US012656359B2

(12) United States Patent
Narikawa et al.

(10) Patent No.: US 12,656,359 B2
(45) Date of Patent: Jun. 16, 2026

(54) ANALYSIS DEVICE, SPECIMEN PRODUCTION DEVICE, INSPECTION DEVICE, OPERATION METHOD FOR SPECIMEN PRODUCTION DEVICE, AND OPERATION METHOD FOR INSPECTION DEVICE

(71) Applicant: Hitachi High-Tech Corporation, Tokyo (JP)

(72) Inventors: Sakiko Narikawa, Tokyo (JP); Naomi Ishii, Tokyo (JP); Megumi Mizuno, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 518 days.

(21) Appl. No.: 18/279,438

(22) PCT Filed: Mar. 9, 2021

(86) PCT No.: PCT/JP2021/009348
§ 371 (c)(1),
(2) Date: Aug. 30, 2023

(87) PCT Pub. No.: WO2022/190216
PCT Pub. Date: Sep. 15, 2022

(65) Prior Publication Data
US 2024/0183870 A1 Jun. 6, 2024

(51) Int. Cl.
G01N 35/00 (2006.01)
G01N 1/38 (2006.01)

(52) U.S. Cl.
CPC ......... G01N 35/00603 (2013.01); G01N 1/38 (2013.01); G01N 35/00069 (2013.01); G01N 2035/00168 (2013.01)

(58) Field of Classification Search
CPC .............. G01N 35/00603; G01N 1/38; G01N 35/00069; G01N 2035/00168;
(Continued)

(56) References Cited

U.S. PATENT DOCUMENTS

| | | | |
|---|---|---|---|
| 2019/0218591 A1* | 7/2019 | Vacic | C12Q 1/18 |
| 2020/0164378 A1 | 5/2020 | Watanabe et al. | |
| 2020/0271678 A1* | 8/2020 | Akutsu | G01N 35/00584 |

FOREIGN PATENT DOCUMENTS

| | | |
|---|---|---|
| JP | 9-43249 A | 2/1997 |
| JP | 3723095 B2 | 12/2005 |
(Continued)

OTHER PUBLICATIONS

English Written Opinion—PCT/JP2021/009348. (Year: 2021).*
(Continued)

*Primary Examiner* — Brian J. Sines
(74) *Attorney, Agent, or Firm* — Crowell & Moring LLP

(57) ABSTRACT

An analysis device according to the present invention comprises: at least one inspection device that inspects a specimen; and at least one specimen production device that produces a specimen. The analysis device is provided with a data processing unit that processes data. The inspection device and the specimen production device are each provided with a communication unit for communicating with each other. The specimen production device is provided with a control unit that controls the specimen production device and a production unit that produces a specimen. The inspection device is provided with a control unit that controls the inspection device and an inspection unit that inspects a specimen. The data processing unit calculates a value [number of specimens A] representing the number of specimens which have not been delivered to the inspection device and a value [number of specimens B] representing the sum of the number of specimens for which inspection can be addition- (Continued)

ally started in the inspection device and the number of specimens which are being inspected and the inspection of which will be completed in a prescribed time. The control unit of the specimen production device prohibits production of a new specimen in the specimen production device when the [number of specimens A] and the [number of specimens B] satisfy a first relationship.

12 Claims, 8 Drawing Sheets

(58) Field of Classification Search
CPC ......... G01N 35/00871; G01N 35/0092; G01N 35/00722; G01N 2035/00831; G16H 10/40; C12M 41/48
See application file for complete search history.

(56) References Cited

FOREIGN PATENT DOCUMENTS

| | | |
|---|---|---|
| JP | 2009-201368 A | 9/2009 |
| WO | WO 2019/031451 A1 | 2/2019 |

OTHER PUBLICATIONS

International Search Report (PCT/ISA/210) issued in PCT Application No. PCT/JP2021/009348 dated May 11, 2021 with English translation (4 pages).
Japanese-language Written Opinion (PCT/ISA/237) issued in PCT Application No. PCT/JP2021/009348 dated May 11, 2021 (3 pages).

* cited by examiner

[FIG. 1]
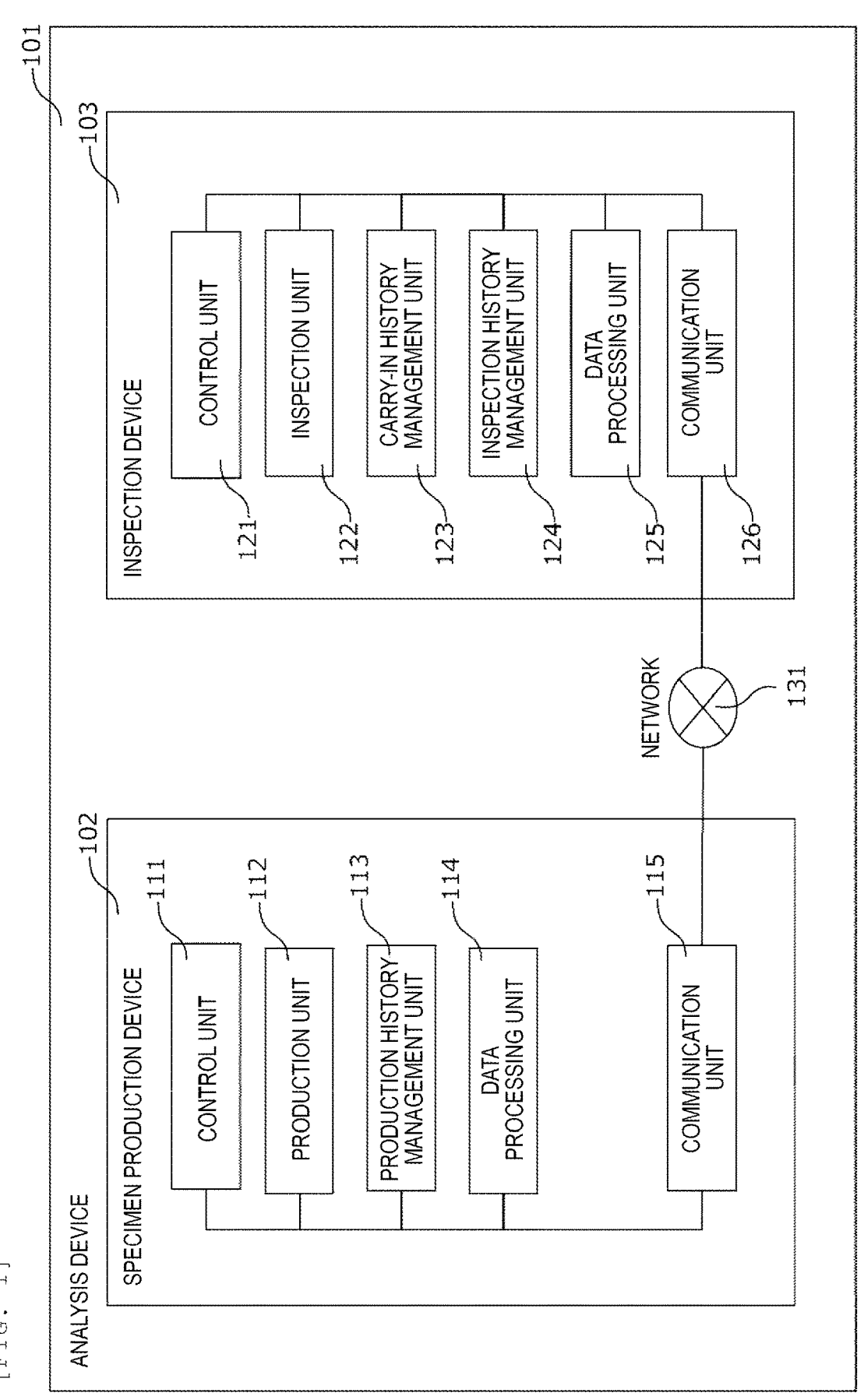

[FIG. 2]
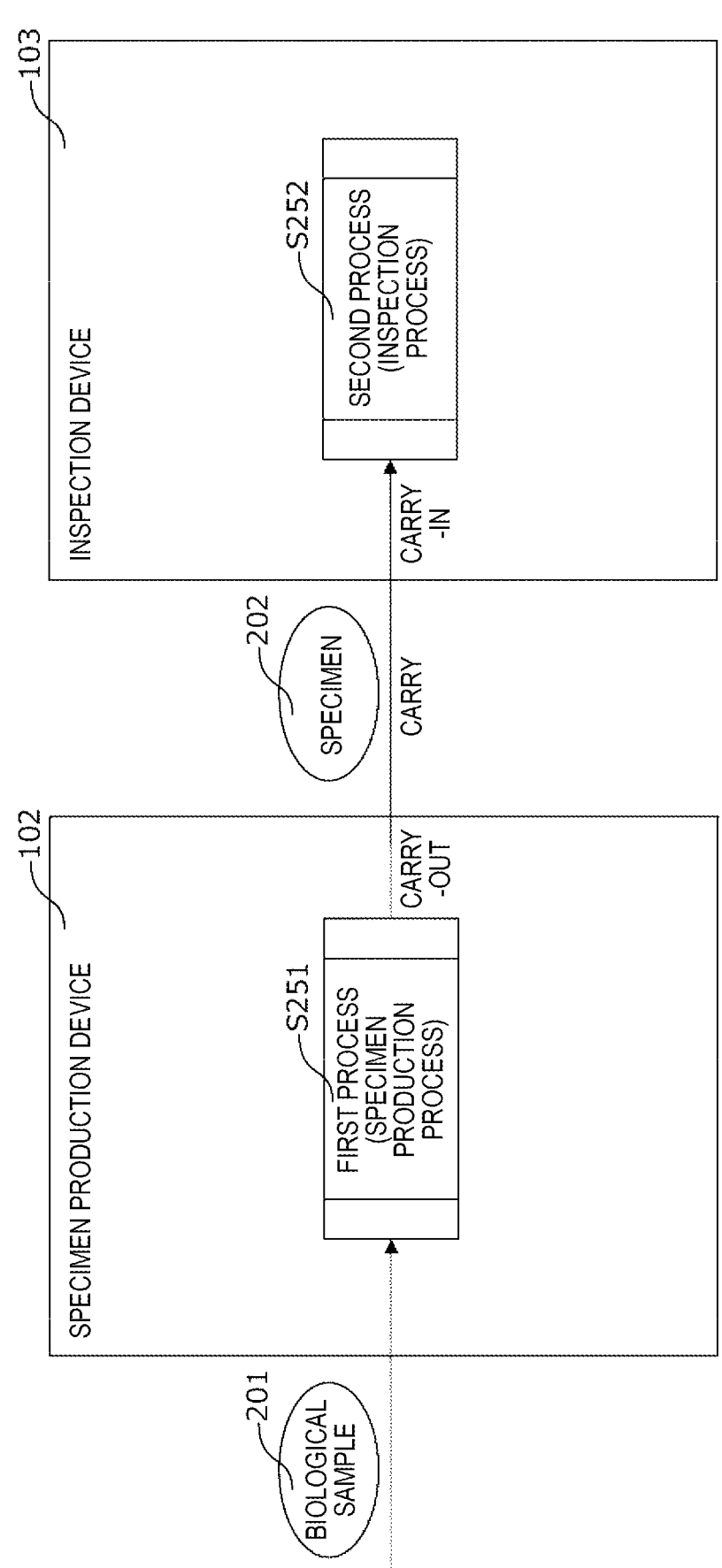

[FIG. 3]

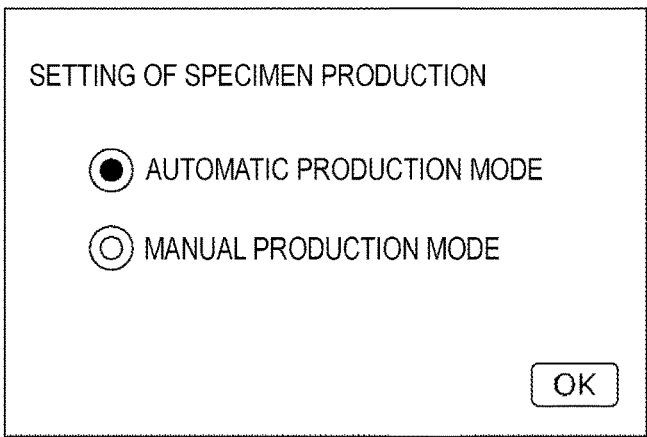

SETTING OF SPECIMEN PRODUCTION

⦿ AUTOMATIC PRODUCTION MODE

◯ MANUAL PRODUCTION MODE

( START )

↓

PRODUCTION BY SPECIMEN PRODUCTION DEVICE IS COMPLETED, AND NUMBER OF SPECIMENS [NUMBER OF SPECIMENS A] OF NO CARRY-IN TO INSPECTION DEVICE IS OBTAINED — S401

↓

OBTAIN SUM [NUMBER OF SPECIMENS B] OF NUMBER OF SPECIMENS OF WHICH INSPECTION IS ADDITIONALLY STARTED IN INSPECTION DEVICE AND NUMBER OF SPECIMENS OF ON-INSPECTION OF WHICH INSPECTION IS COMPLETED IN PRESCRIBED TIME — S402

↓

[NUMBER OF SPECIMENS A] ≥ [NUMBER OF SPECIMENS B]? — S403

YES / NO

S404 — PROHIBIT PRODUCTION OF NEW SPECIMEN IN SPECIMEN PRODUCTION DEVICE

S405 — PERMIT PRODUCTION OF NEW SPECIMEN IN SPECIMEN PRODUCTION DEVICE

↓

( END )

[FIG. 5]
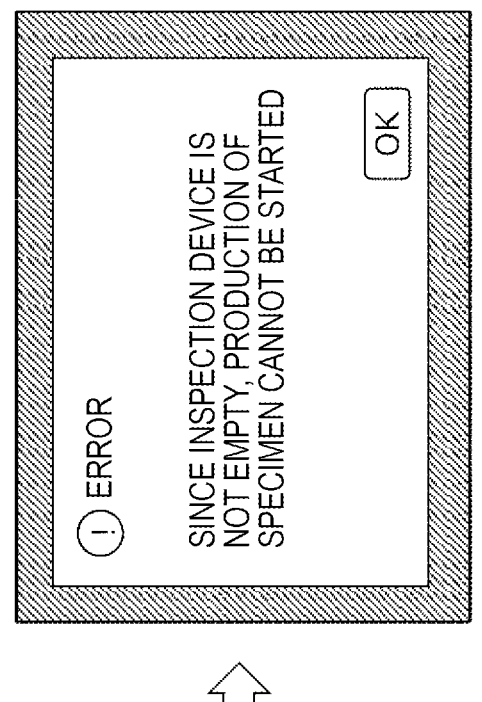
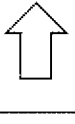
(a) SPECIMEN PRODUCTION START SCREEN
ERROR
SINCE INSPECTION DEVICE IS NOT EMPTY, PRODUCTION OF SPECIMEN CANNOT BE STARTED
OK
(b) DIALOG SCREEN (SPECIMEN PRODUCTION IS NOT PERMITTED)
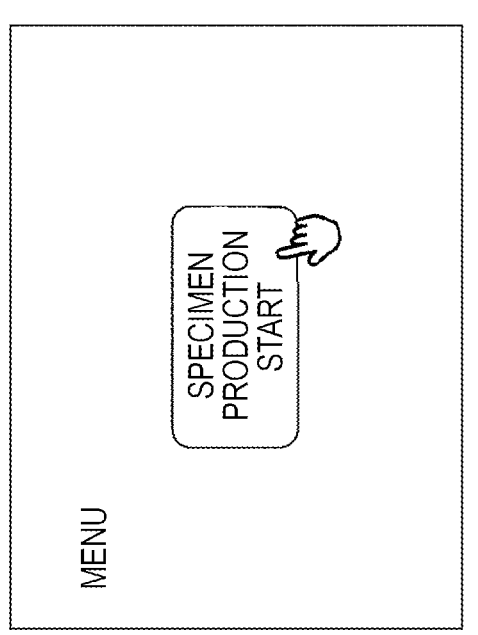
MENU
SPECIMEN PRODUCTION START
SINCE INSPECTION DEVICE IS NOT EMPTY, PRODUCTION OF SPECIMEN CANNOT BE STARTED
INACTIVE
(c) SPECIMEN PRODUCTION START SCREEN
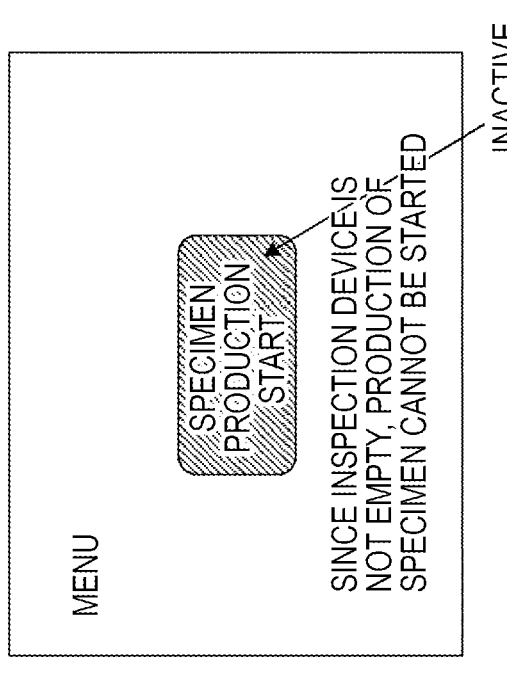

[FIG. 6]
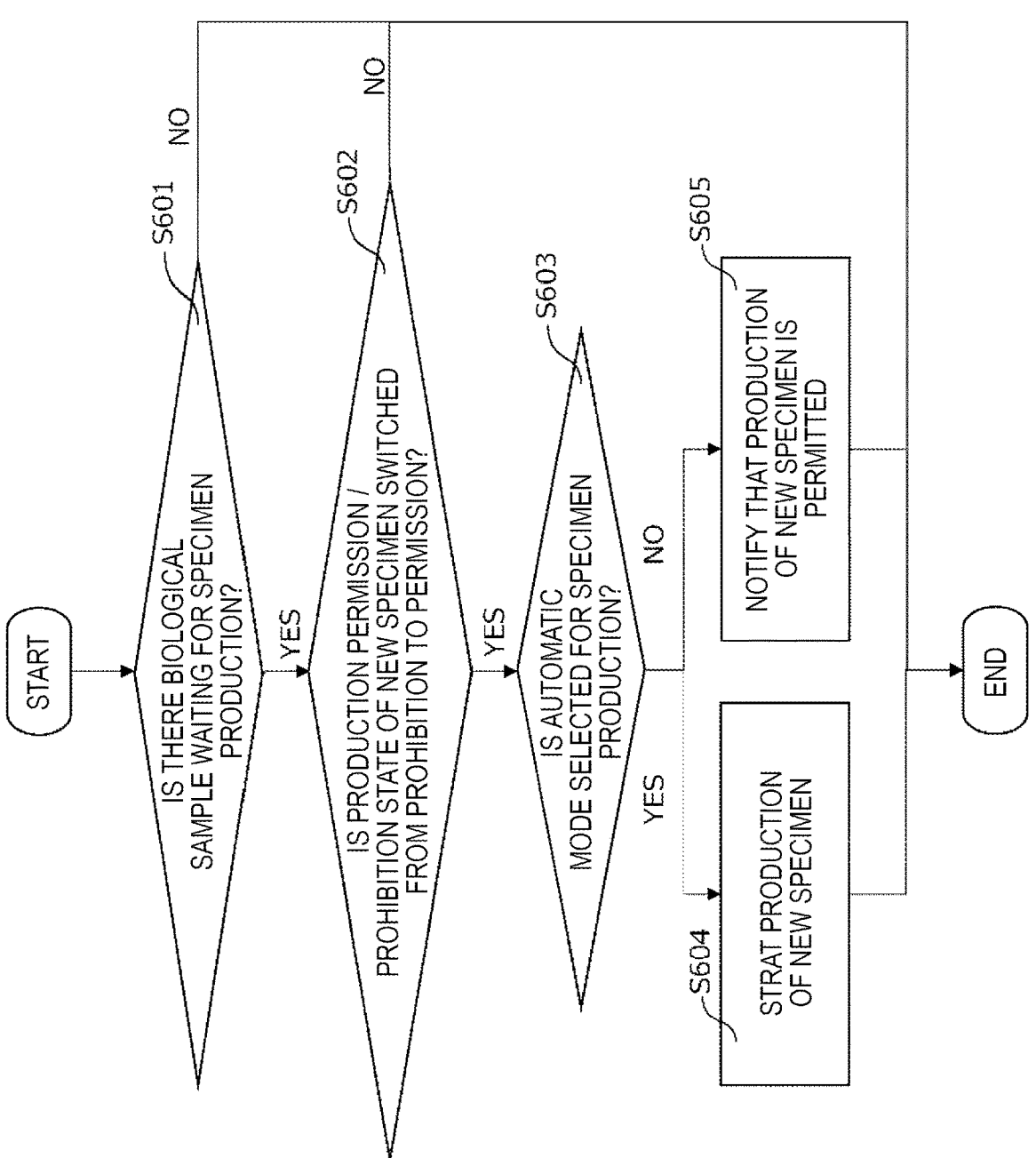

[FIG. 7]
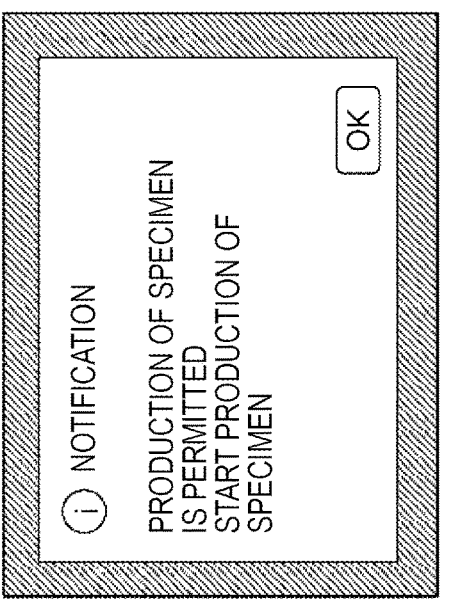
(b) DIALOG SCREEN
(WHEN MANUAL PRODUCTION
MODE IS SELECTED)
NOTIFICATION
PRODUCTION OF SPECIMEN
IS PERMITTED
START PRODUCTION OF
SPECIMEN
OK
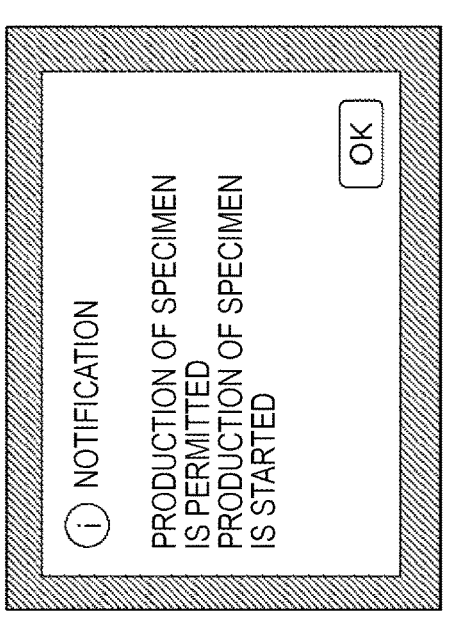
(a) DIALOG SCREEN
(WHEN AUTOMATIC PRODUCTION
MODE IS SELECTED)
NOTIFICATION
PRODUCTION OF SPECIMEN
IS PERMITTED
PRODUCTION OF SPECIMEN
IS STARTED
OK

[FIG. 8]
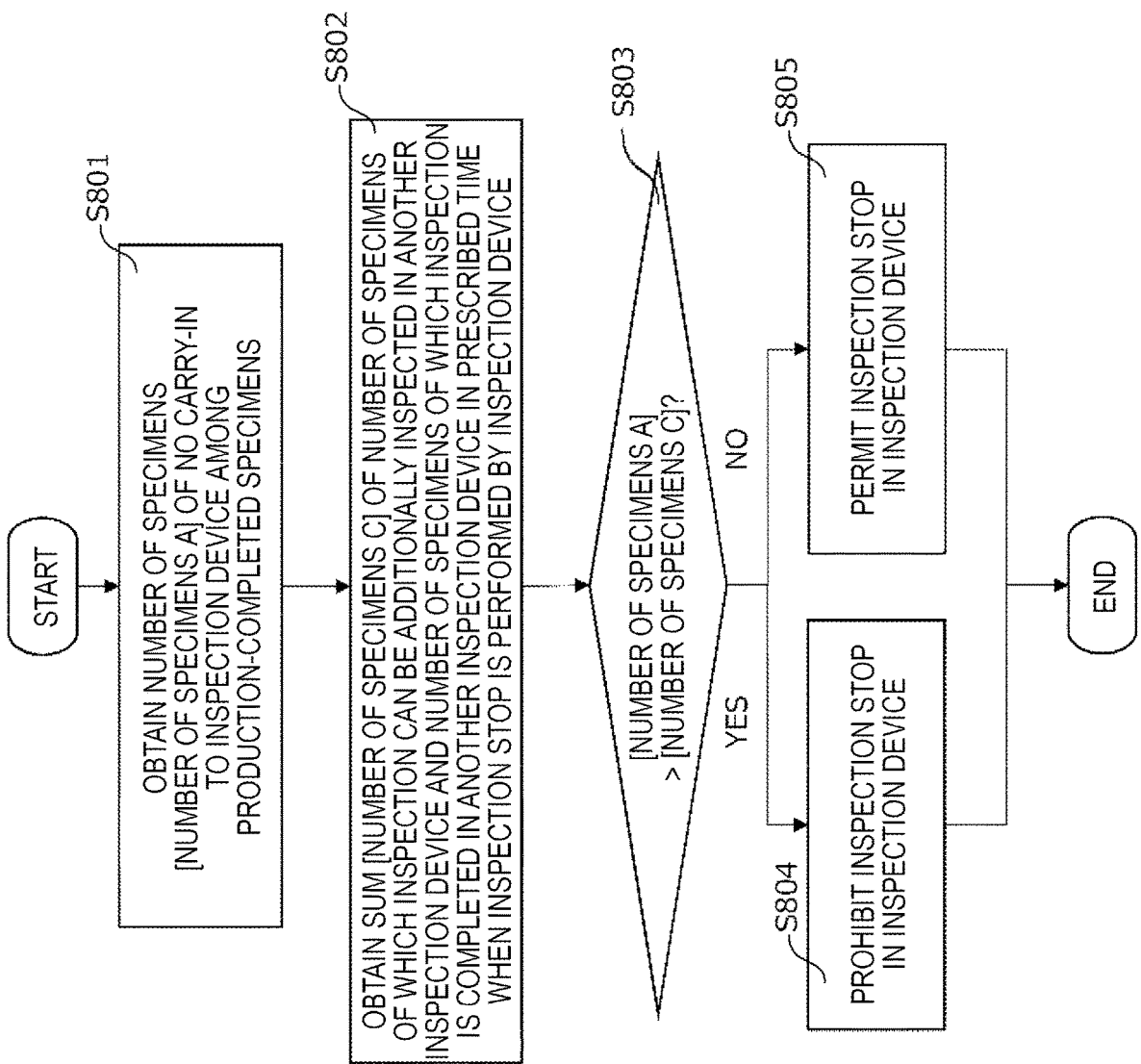

[FIG. 9]
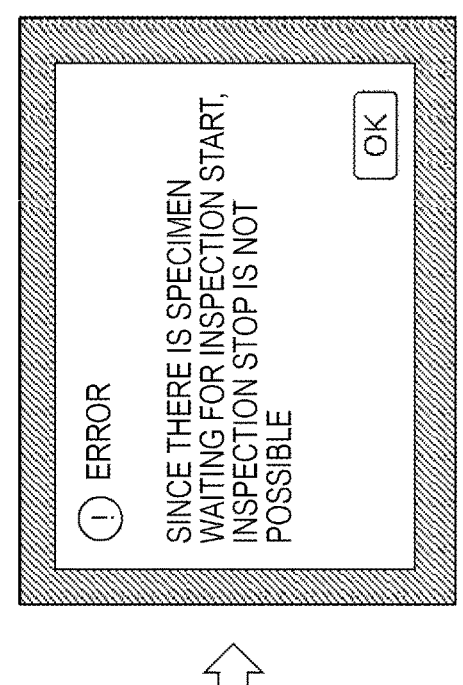
(a) INSPECTION STOP SCREEN
ERROR
SINCE THERE IS SPECIMEN WAITING FOR INSPECTION START, INSPECTION STOP IS NOT POSSIBLE
OK
(b) DIALOG SCREEN (INSPECTION STOP IS NOT PERMITTED)
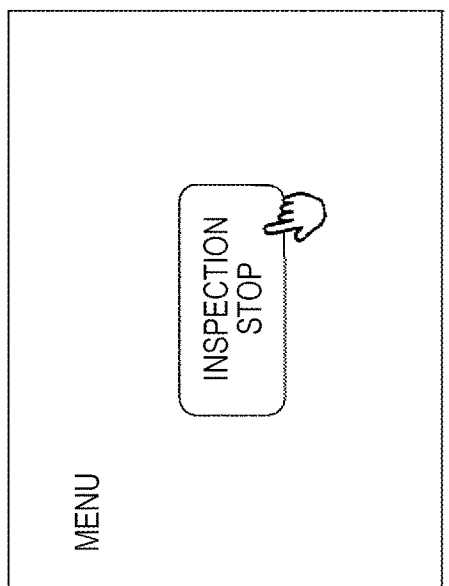
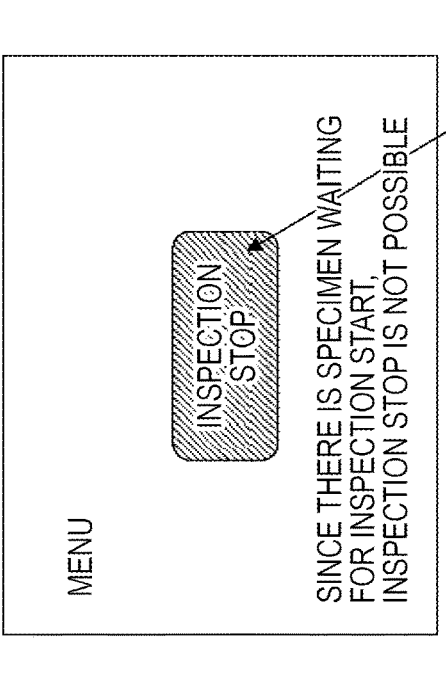
MENU
INSPECTION STOP
INACTIVE
SINCE THERE IS SPECIMEN WAITING FOR INSPECTION START, INSPECTION STOP IS NOT POSSIBLE
(c) INSPECTION STOP SCREEN

ANALYSIS DEVICE, SPECIMEN PRODUCTION DEVICE, INSPECTION DEVICE, OPERATION METHOD FOR SPECIMEN PRODUCTION DEVICE, AND OPERATION METHOD FOR INSPECTION DEVICE

TECHNICAL FIELD

The present invention relates to an analysis device, a specimen production device, an inspection device, an operation method for a specimen production device, and an operation method for an inspection device.

BACKGROUND ART

The inspection of the biological sample in the related art generally includes a process of producing the specimen by using the specimen production device and a process of inspecting the specimen by using the inspection device. Unless the inspection in the inspection device is started in a prescribed time for the specimen of which production is completed, there is a possibility that an accurate inspection result cannot be obtained.

For example, in the bacteriological inspection, in the specimen production process, the collected sample is dispensed into the well plate coated with the antibacterial agent. After that, during the inspection process, the plates are monitored to analyze the pace at which the bacteria proliferates, and the appropriate antibacterial agent is determined. When the inspection is not started in a prescribed time after the specimen is produced, the antibacterial agent leaches out and acts on the bacteria, or the corrosion of the specimen progresses, and the bacteria is caused to proliferate at an unusual pace. Accurate inspection results cannot be obtained in such a situation. Therefore, it is important to start the inspection in a prescribed time where the quality of the specimen is maintained after the production of the specimen is completed.

However, when the operating rate of the inspection device reaches the upper limit, the inspection of the new specimen cannot be started. After the production of the specimen is completed, while waiting for the inspection device to become available, the situation may occur in which the quality of the specimen deteriorates due to exceeding the prescribed time.

PTL 1 discloses a dispensing device in which a plurality of child specimens produced by dispensing from a parent specimen are accommodated in an accommodating member for each inspection item to be subsequently performed and the child specimens are managed for each accommodating member, the dispensing device including: a setting means that sets an alarm determination time according to the inspection item to be performed on the child specimen accommodated in each accommodating member; a storage means that stores a child specimen generation time in which the child specimen accommodated firstly in each accommodating member is generated; a monitoring means that monitors an elapsed time from the child specimen generation time to a current time for each accommodating member; and an alarm processing means that performs an alarm process according to a monitoring result of the monitoring means, in which the monitoring means includes a determination means that determines whether the elapsed time exceeds a predetermined alarm determination time for each accommodating member, and the alarm processing means includes a warning means that notifies existence of the accommodating member exceeding the predetermined alarm determination time.

CITATION LIST

Patent Literature

PTL 1: JP3723095B

SUMMARY OF INVENTION

Technical Problem

However, the related art has a problem that the specimen may not be inspected within an appropriate time after the production of the specimen is completed.

For example, in JP-B-3723095, when the production-completed specimen is not accommodated in the accommodating member even after exceeding the alarm determination time, the warning is issued, and time management is performed to prevent the specimen from being left unattended. However, it is not considered the possibility that there is no space in the accommodating member when the warning is issued and the specimen cannot be accommodated. When there is no space in the accommodating member, the specimen cannot be inspected within an appropriate time.

In view of the above problems, an object of the invention is to provide an analysis device, a specimen production device, an inspection device, an operation method for a specimen production device, and an operation method for an inspection device that can manage the specimen so that the inspection is performed within an appropriate time after the production of the specimen is completed.

Solution to Problem

An example of an analysis device according to the invention is an analysis device including: at least one inspection device performing inspection of a specimen; and at least one specimen production device producing the specimen, in which the analysis device includes a data processing unit processing data, each of the inspection device and the specimen production device includes a communication unit communicating with each other, the specimen production device includes a control unit controlling the specimen production device, and a production unit producing the specimen, the inspection device includes a control unit controlling the inspection device, and an inspection unit performing inspection of the specimen, in which in the analysis device, the data processing unit calculates a value [number of specimens A] representing the number of specimens of no carry-in to the inspection device, and a value [number of specimens B] representing a sum of the number of specimens of which the inspection can be additionally started in the inspection device and the number of specimens of on-inspection of which the inspection is completed in a prescribed time, and the control unit of the specimen production device prohibits production of a new specimen in the specimen production device when the [number of specimens A] and the [number of specimens B] satisfy a first relationship.

An example of a specimen production device according to the invention is a specimen production device producing a specimen, the device including: a control unit controlling the specimen production device; a production unit producing the specimen; a data processing unit processing data; and a communication unit communicating with an inspection device performing inspection of the specimen, in which, in the specimen production device, the data processing unit calculates a value [number of specimens A] representing the number of specimens of no carry-in to the inspection device, and a value [number of specimens B] representing a sum of the number of specimens of which the inspection can be additionally started in the inspection device and the number of specimens of on-inspection of which the inspection is completed in a prescribed time, and the control unit prohibits production of a new specimen when the [number of specimens A] and the [number of specimens B] satisfy a first relationship.

An example of an inspection device according to the invention is an inspection device performing inspection of a specimen, the device including: a control unit controlling the inspection device; an inspection unit inspecting the specimen; and a data processing unit processing data, in which, in the inspection device, the data processing unit calculates a value [number of specimens A] representing the number of specimens of no carry-in to the inspection device, and a value [number of specimens C] representing a sum of the number of specimens of which the inspection can be additionally started in another inspection device and the number of specimens of on-inspection of which the inspection is completed in another inspection device in a prescribed time, and the control unit prohibits inspection stop when the [number of specimens A] and the [number of specimens C] satisfy a second relationship.

An example of an operation method for a specimen production device producing a specimen according to the invention, the method including: a step of allowing a data processing unit of the specimen production device to calculate a value [number of specimens A] representing the number of specimens of no carry-in to an inspection device, and a value [number of specimens B] representing a sum of the number of specimens of which the inspection can be additionally started in the inspection device and the number of specimens of on-inspection of which the inspection is completed in a prescribed time, and a step of allowing a control unit of the specimen production device to prohibit production of a new specimen in the specimen production device when the [number of specimens A] and the [number of specimens B] satisfy a first relationship.

An example of an operation method for an inspection device performing inspection of a specimen according to the invention, the method including: a step of allowing a data processing unit of the inspection device to calculate a value [number of specimens A] representing the number of specimens of no carry-in to the inspection device, and a value [number of specimens C] representing a sum of the number of specimens of which the inspection can be additionally started in another inspection device and the number of specimens of on-inspection of which the inspection is completed in another inspection device in a prescribed time; and a step of allowing a control unit of the inspection device to prohibit inspection stop when the [number of specimens A] and the [number of specimens C] satisfy a second relationship.

Advantageous Effects of Invention

According to the invention, it is possible to manage the specimen so that inspection is performed within an appropriate time after the production of the specimen is completed.

BRIEF DESCRIPTION OF DRAWINGS

FIG. 1 is a diagram illustrating a configuration of a specimen production device and an inspection device according to a first embodiment of the invention.

FIG. 2 is a diagram illustrating an overview of a specimen production process and an inspection process according to the first embodiment.

FIG. 3 is a diagram illustrating a specimen production mode setting screen in the specimen production device according to the first embodiment.

FIG. 4 is a diagram illustrating a specimen production permission/prohibition determination process in the specimen production device according to the first embodiment.

FIG. 5 is a diagram illustrating a specimen production start screen in the specimen production device according to the first embodiment.

FIG. 6 is a diagram illustrating a process when a specimen production permission/prohibition state in the specimen production device according to the first embodiment transitions to a state representing permission.

FIG. 7 is a diagram illustrating a dialog screen when the specimen production permission/prohibition state in the specimen production device according to the first embodiment transitions to the state representing permission.

FIG. 8 is a diagram illustrating an inspection stop permission/prohibition determination process in an inspection device according to a second embodiment of the invention.

FIG. 9 is a diagram illustrating an inspection stop screen in the inspection device according to the second embodiment.

DESCRIPTION OF EMBODIMENTS

Embodiments will be described below with reference to the drawings.

First Embodiment

In the first embodiment, an analysis device and a specimen production device managing whether the specimen production is permitted according to an operating status of an inspection device will be described.

FIG. 1 illustrates a configuration of the specimen production device and the inspection device according to the first embodiment. In FIG. 1, an analysis device 101 includes at least one specimen production device 102 producing the specimen (for example, the sample specimen), at least one inspection device 103 inspecting the specimen (for example, the sample specimen), and a network 131 communicably connecting the specimen production device 102 and the inspection device 103. The analysis device 101, the specimen production device 102, and the inspection device 103 implement the operation methods described in this specification.

The specimen production device 102 includes a control unit 111 controlling the specimen production device 102, a production unit 112 producing the specimen, a data processing unit 114 processing data, and a communication unit 115 communicating with the inspection device 103. In addition, the specimen production device 102 may include a production history management unit 113 managing the production history of the specimen.

The inspection device 103 includes a control unit 121 controlling the inspection device 103, an inspection unit 122 inspecting the specimen, a data processing unit 125 processing data, and a communication unit 126 communicating with the specimen production device 102. In addition, the inspection device 103 may include a carry-in history management unit 123 managing the carry-in history of the specimen and an inspection history management unit 124 managing the inspection history of the specimen.

It is noted that FIG. 1 does not limit the unit of physical configuration in the analysis device 101. For example, although the specimen production device 102 and the inspection device 103 are configured as separate devices in FIG. 1, the specimen production device 102 and the inspection device 103 may be integrated. In addition, in FIG. 1, the control unit 111, the production unit 112, the production history management unit 113, the data processing unit 114, and the communication unit 115 of the specimen production device 102 are illustrated as independent components, but these components may be configured with any number of hardware, (for example, one or more computers). The same applies to the inspection device 103. In addition, the entire analysis device 101 may be configured by using one computer.

When a plurality of computers are used, each computer may be communicatively connected by a suitable communication means (including, for example, a universal serial bus (USB)).

The computer includes, for example, a computing means and a storage means. The computing means includes, for example, a processor, and the storage means includes, for example, storage media such as semiconductor memory devices and magnetic disk devices. The processor may be configured by using a circuit board. A portion or all of the storage unit may be a non-transitory storage unit.

In addition, the computer may include an input/output means. The input/output means includes, for example, input devices such as a keyboard and a mouse, output devices such as a display and a printer, and communication devices such as a network interface.

The storage means may store programs. A computer may perform the functions described in this embodiment by a processor performing this program.

The specimen production device 102 is a device capable of producing the specimen from the sample (for example, the biological sample). The analysis device 101 may have a plurality of the specimen production devices 102, and the plurality of specimen production devices 102 may be connected to the network 131.

The inspection device 103 is a device inspecting the specimen produced by the specimen production device 102. The analysis device 101 may have the plurality of inspection devices 103, and the plurality of inspection devices 103 may be connected to the network 131.

The control unit 111 controls the entire specimen production device 102 or each unit.

The production unit 112 is a mechanism producing the specimen from the sample (for example, the biological sample) carried-in to the specimen production device 102 and has functions such as holding, stirring, diluting, producing, and dispensing the biological sample. In addition, the production unit 112 may have functions of carrying, heating, humidifying, storing the biological sample, and the like. The biological sample is processed into the specimen by being processed in the production unit 112.

The production history management unit 113 manages and records information on the production history such as a time when each specimen is produced by the production unit 112. The identification information of the specimen, the identification information of the specimen production device producing the specimen, and the like may be managed and recorded together.

The data processing unit 114 calculates the number of specimens of no carry-in to the inspection device 103. The "number of specimens of no carry-in" refers to the total number of specimens of no carry-in to the inspection device 103, for example, among the on-production specimens or the production-completed specimens in the specimen production device 102. The calculation of the number of specimens of no carry-in can be performed, for example, based on information such as the production history recorded in the production history management unit 113, the carry-in history recorded in the carry-in history management unit 123, the carry-in history received in the communication unit 115, and the like.

The control unit 121 controls the entire inspection device 103 or each unit.

The inspection unit 122 is a mechanism inspecting the specimen carried-in to the inspection device 103 and has, for example, functions of holding and imaging the specimen. In addition, the inspection unit 122 may have functions of carrying, heating, humidifying, and storing the specimen. When inspecting the plurality of specimens in the inspection unit 122, the plurality of specimens may be inspected simultaneously in parallel, or may be inspected sequentially one by one.

The carry-in history management unit 123 manages and records the information on the carry-in history such as the time when each specimen is carried-in to the inspection device 103. The identification information and the like of the specimen may be managed and recorded together.

The inspection history management unit 124 manages and records the information on the inspection history such as the inspection start time and the inspection end time in the inspection unit 122 of each specimen. The identification information on the specimen, the type of the specimen, the identification information on the inspection device that inspected the specimen, the time required for the inspection, the inspection pattern, and the like, may be managed and recorded together.

The data processing unit 125 calculates the number of specimens and the like that can be additionally inspected in the inspection device 103, and the like. The "number of specimens that can be additionally inspected" may be, for example, the number of specimens that can be inspected immediately upon being carried-in to the inspection device 103 and may be the number of specimens that are vacant among inspection slots in the inspection device 103. This number can be calculated based on information on, for example, the production history recorded in the production history management unit 113, the carry-in history recorded in the carry-in history management unit 123, the inspection history recorded in the inspection history management unit 124, and the like. The calculation process is performed, for example, at a scheduled inspection end time of each specimen. When the plurality of inspection devices 103 exist, the calculation process is performed for each inspection device.

The communication unit 115 and the communication unit 126 have the network connection, the universal serial bus (USB) connection, an ultrasonic unit, an infrared communication device, and the like and is an interface having a function of mutual communication between the communication unit 115 and the communication unit 126. When communication is performed in the direction from the communication unit 115 to the communication unit 126, the communication unit 115 may perform, as a subject, communication with the communication unit 126 or may perform communication so as to respond from the communication unit 115 to the communication unit 126 as a trigger to the request from the communication unit 126 to the communication unit 115. When communication is performed in the direction from the communication unit 126 to the communication unit 115, the communication unit 126 may perform, as a subject, communication with the communication unit 115 or may perform communication so as to respond from the communication unit 126 to the communication unit 115 as a trigger to the request from the communication unit 115 to the communication unit 126.

The network 131 enables communication between the components connected to the network 131.

The data processing unit 114 and the data processing unit 125 may perform a portion or all of the processes performed by the other one. When the process is integrated into one of the processes, only one of the data processing unit 114 and the data processing unit 125 where the process is integrated may exist. That is, one data processing unit may be provided for the analysis device 101. In addition, the data processing unit may be arranged independently from the specimen production device 102 and the inspection device 103. Alternatively, the data processing unit 114 and the data processing unit 125 may overlap a portion or all of the processes.

FIG. 2 illustrates an overview of the specimen production process and the inspection process. Hereinafter, a biological sample is used as an example of the sample. In the inspection of the biological sample, first, the biological sample 201 is carried-in to the specimen production device 102, and a specimen production process S251 (first process) is performed on the biological sample 201. When S251 is completed, the specimen 202 is completed.

Next, the specimen 202 is carried-out from the specimen production device 102, carried, and carried-in to the inspection device 103. Finally, in the inspection device 103, an inspection process S252 (second process) is performed on the specimen 202.

In the inspection of the biological sample, in order to ensure the quality of the specimen, there exists generally the case where S251 is performed, the specimen is carried-in to the inspection device 103 in a prescribed time, and S252 is started.

The process of carrying-out, carrying, and carrying-in the specimen 202 from the specimen production device 102 in the inspection device 103 may be automatically performed by using a carry mechanism provided in or connected to the specimen production device 102 or the inspection device 103. Alternatively, the user may manually perform the process. Alternatively, a portion of carrying-out, carrying, and carrying-in the specimen may automatically be performed, and a remaining portion may manually be performed.

The specimen production process of S251 may be any process as long as it is the process of producing the specimen. For example, the specimen production device 102 may be an extraction device for a genetic inspection. In that case, the specimen production process of S251 may include a nucleic acid extraction process in the genetic inspection, and the sample containing the extracted nucleic acid may be the specimen.

The inspection process of S252 may be any process as long as it is the process of inspecting the specimen. For example, the inspection device 103 may be a polymerase chain reaction (PCR) inspection device for genetic inspection. In that case, the inspection process of S252 may include the PCR inspection process in the genetic inspection.

FIG. 3 illustrates a specimen production mode setting screen in the specimen production device. The specimen production device 102 can select any one of the automatic production mode or the manual production mode for the production of the specimen. On the specimen production mode setting screen of FIG. 3, in the production of the specimen, any one of the automatic production mode and the manual production mode can be selected and set by the user.

When the automatic production mode is selected, the specimen production device 102 automatically processes the biological sample to produce the specimen. For example, the specimen is continuously produced as long as the biological sample is present without user intervention. Moreover, the production-completed sample may be automatically carried-in to the inspection device 103.

On the other hand, when the manual production mode is selected, the user manually processes the biological sample by using the specimen production device 102 to produce the specimen. For example, the user manually carries-in the biological sample to the specimen production device 102, produces the specimen, and carries-in the production-completed specimen to the inspection device 103.

FIG. 4 illustrates the specimen production permission/prohibition determination process in the specimen production device. This process represents the method performed by the analysis device 101 or the specimen production device 102. A series of flows illustrated in FIG. 4 is repeatedly performed by the control unit 111. For example, when a prescribed time has elapsed from the start or end of the series of flows illustrated in FIG. 4, the series of flows illustrated in FIG. 4 is started again.

First, in S401, the data processing unit 114 calculates the number of specimens of no carry-in to the inspection device 103. The number of specimens is used as a value [number of specimens A]. After the process of S401 is completed, the process proceeds to S402.

In S402, the data processing unit 114 calculates the sum of the number of specimens that can be additionally inspected in the inspection device 103 and the number of specimens of on-inspection of which the inspection is completed by the inspection device 103 in a prescribed time. The sum is used as a value [number of specimens B]. This "prescribed time" can be appropriately designed by those skilled in the art, but for example, after the specimen is produced, the maximum time during which the specimen can maintain the quality appropriately for inspection is set. After the process of S402 is completed, the process proceeds to S403.

In S403, the data processing unit 114 determines whether the [number of specimens A] obtained in S401 and the [number of specimens B] obtained in S402 satisfy the predetermined relationship (first relationship). In this embodiment, when the first relationship is represented by the [number of specimens A]≥the [number of specimens B] and this relationship satisfied (that is, when the [number of specimens A] is equal to or larger than the [number of specimens B]), the process proceeds to S404. Otherwise, the process proceeds to S405.

In S404, the control unit 111 prohibits production of a new specimen by the specimen production device 102. As a result, in the specimen production device 102, the specimen production permission/prohibition state transitions to a state representing prohibition. When the process of S404 is completed, the series of flows illustrated in FIG. 4 is ended.

In S405, the control unit 111 permits the production of the new specimen in the specimen production device 102. As a result, in the specimen production device 102, the specimen production permission/prohibition state transitions to a state representing permission. When the process of S405 is completed, the series of flows illustrated in FIG. 4 is ended.

With respect to the process described to be performed in the data processing unit 114 in the description of FIG. 4, a portion or all of the processes are performed in the data processing unit 125, and the processing result may be transferred from the data processing section 125 to the data processing unit 114 via the communication unit 115.

FIG. 5 illustrates a specimen production start screen in the specimen production device. The specimen production device 102 may include the display device not illustrated in FIG. 1, and the screen of FIG. 5 may be output on the display device.

When the automatic production mode is selected, in a case where the user presses a "specimen production start" button when the production of the new specimen is permitted on the specimen production start screen of FIG. 5(a), the specimen production device 102 starts the production of the specimen. On the other hand, in a case where the user presses the "specimen production start" button when the production of the new specimen is prohibited, the screen transitions to a dialog screen of FIG. 5(b) representing that the specimen production is not permitted.

As a modification, when the production of the new specimen is prohibited, as illustrated in FIG. 5(c), the "specimen production start" button may be displayed in an inactive state (for example, in a color different from that in FIG. 5(a)) so that the "specimen production start" button cannot be operated.

By displaying such a screen, when the production of the new specimen is prohibited, the user cannot produce the new specimen and can know that the production of the new specimen is prohibited.

It is noted that FIG. 5 illustrates an example in which the automatic production mode is selected, when the manual production mode is selected, a message representing that the production of the new specimen is prohibited may be output.

FIG. 6 illustrates a process when the specimen production permission/prohibition state in the specimen production device transitions to the state representing permission. A series of flows illustrated in FIG. 6 is repeatedly performed by the control unit 111. That is, when a prescribed time has elapsed since the start or end of the series of flows illustrated in FIG. 6, the series of flows illustrated in FIG. 6 is started again.

First, in S601, the data processing unit 114 determines whether there is a biological sample waiting for the specimen production. In the case of Yes, the process proceeds to S602. In the case of No, the series of flows illustrated in FIG. 6 is ended.

In S602, the data processing unit 114 determines whether the production permission/prohibition state of the new specimen in the specimen production device is switched from prohibition to permission. In order to determine whether the state is switched, for example, the production permission/prohibition state at the time when S602 is last performed and the current production permission/prohibition state are compared, and when the previous state is prohibited and the current state is permitted, it can be determined that the prohibition is switched to permission. When the prohibition is switched to the permission, the process proceeds to S603. Otherwise, the series of flows illustrated in FIG. 6 is ended.

In S603, the data processing unit 114 determines whether the automatic production mode is selected for the specimen production. When the automatic production mode is selected, the process proceeds to S604. Otherwise, the process proceeds to S605.

In S604, the control unit 111 starts the production of the new specimen in the specimen production device 102. In this manner, the control unit 111 starts the production of the new specimen when the automatic production mode is selected in a case of releasing the prohibition of the production of the new specimen. When the process of S604 is completed, the series of flows illustrated in FIG. 6 is ended.

In S605, the control unit 111 notifies that the specimen production device 102 can produce the new specimen. This notification may be output on the display device of the specimen production device 102. In this manner, the control unit 111 notifies that the production of the new specimen is permitted when the manual production mode is selected, in a case of releasing the prohibition of the production of the new specimen. This notification may be output on the display device of the specimen production device 102. When the process of S605 is completed, the series of flows illustrated in FIG. 6 is ended.

With respect to the process described to be performed in the data processing unit 114 in the description of FIG. 6, a portion or all of the processes are performed in the data processing unit 125, and the processing result may be transferred from the data processing section 125 to the data processing unit 114 via the communication unit 115.

FIG. 7 illustrates the dialog screen when the specimen production permission/prohibition state of the specimen production device transitions to the permission start. These screens may be output on the display device of the specimen production device 102.

FIG. 7(a) is the dialog screen when the automatic production mode is selected. This dialog screen is displayed, for example, in S604. In response to the transition of the specimen production permission/prohibition state from the state representing prohibition to the state representing permission, the specimen production device 102 automatically starts the production of the specimen and notifies the user of the fact.

FIG. 7(b) is the dialog screen when the manual production mode is selected. This dialog screen is displayed, for example, in S605. After the specimen production permission/prohibition transitions from the state representing prohibition to the state representing permission, the user can use the specimen production device 102 to produce the specimen. The specimen production device 102 notifies the user of this via this dialog screen.

Notification of the fact that the specimen production device 102 automatically starts the production of the specimen or the fact that the specimen can be produced by using the specimen production device is not limited to the display of the dialog screen, but can be performed by ringing an alarm sound, light emission from a lamp, or the like. Alternatively, the combination of these may be notified.

As described above, in the present embodiment, only when the inspection by the inspection device is started in a prescribed time from the production, the production of the specimen by the specimen production device is permitted. Accordingly, it is possible to manage the specimen so that the production is performed within an appropriate time after the production of the specimen is completed, and it is possible to obtain the effect of preventing the time from exceeding the prescribed time while waiting for the inspection device to become available.

In this embodiment, the relationship in S403 is represented by the [number of specimens A]≥the [number of specimens B]. By doing so, it is possible to strictly compare the number of productions to the possible number of inspections, and thus, it is possible to perform optimum management. However, other relational expressions may be used as a modification. For example, a constant representing a margin may be incorporated in the left side, and as a specific example, a positive constant may be added to the left side, or a constant larger than one may be multiplied to the left side.

In this embodiment, as illustrated in S405, after the control unit 111 prohibits the production of the new specimen, when the [number of specimens A] and the [number of specimens B] no longer satisfy the first relationship (that is, the [number of specimens A]<the [number of specimens B]), the prohibition of the production of the new specimen in the specimen production device 102 is released. For this reason, the prohibition of production is automatically released, and efficient operation becomes possible. However, as a modification, it is additionally possible to configure so that such automatic release is not performed.

In the present embodiment, as illustrated in FIGS. 6 and 7, since the control unit 111 performs appropriate notification according to the mode in a case of releasing the prohibition of the production of the new specimen, the user can promptly cope with the restart for the specimen production. However, the notification may be omitted. In addition, the timing of the notification and the contents of the notification may be changed.

In this embodiment, the analysis device 101 includes both the specimen production device 102 and the inspection device 103. As a modification, it is additionally possible to omit the inspection device 103 and configure the invention only by the specimen production device 102. In that case, the above-described effects can be obtained by using the specimen production device 102 together with the inspection device of the related art.

Second Embodiment

Next, a second embodiment will be described. In the first embodiment, after the production of the specimen is completed, without exceeding the prescribed time while waiting for the inspection device to become available, the analysis device and so on managing whether the specimen production is permitted according to the operating status of the inspection device is explained.

However, in the first embodiment, in a case where there is a specimen of no carry-in to the inspection device, when the inspection of the inspection device is stopped and the inspection device shifts to a state where the inspection cannot be restarted immediately, there is a possibility that the inspection by the inspection device may not be started in a prescribed time from the production of the specimen.

In the second embodiment, in view of the above problem, after the production of the specimen is completed, without exceeding the prescribed time while waiting for carry-in to the inspection device, the solving means having the purpose managing whether the inspection stop of inspection device is performed according to the production status of the specimen is explained.

In the second embodiment, the configurations of the specimen production device and the inspection device are the same as those in the first embodiment (contents described with reference to FIG. 1) or the modification thereof. In the following description, the description of the portions common to the first embodiment or the modification thereof may be omitted.

FIG. 8 illustrates the inspection stop permission/prohibition determination process in the inspection device. This process represents the method performed by the analysis device 101 or the inspection device 103. A series of flows illustrated in FIG. 8 is repeatedly performed by the control unit 121. That is, when a prescribed time has elapsed since the start or end of the series of flows illustrated in FIG. 8, the series of flows illustrated in FIG. 8 is started again.

First, in S801, the data processing unit 125 obtains the number of specimens [number of specimens A] of no carry-in to the inspection device 103. This process can be performed, for example, in the same manner as S401. After the process of S801 is completed, the process proceeds to S802.

In S802, when the inspection stop of the inspection device 103 is performed, the data processing unit 125 obtains the sum of the number of specimens that can be additionally inspected by the inspection device and the number of specimens when the inspection is completed by the inspection device in a prescribed time. This sum is used as the [number of specimens C].

When there is a single inspection device 103 (for example, when the analysis device 101 has only one inspection device 103), the [number of specimens C] is 0.

When the analysis device 101 includes the plurality of inspection devices 103, the process of FIG. 8 is performed in each of the inspection devices 103. Herein, focusing on a certain inspection device (first inspection device), the data processing unit 125 of the first inspection device calculates the sum of the number of specimens that can be additionally inspected by another inspection device and the number of specimens of on-inspection of which the inspection is completed in another inspection device in a prescribed time as the [number of specimens C]. After the process of S802 is completed, the process proceeds to S803.

In S803, the data processing unit 125 determines whether the [number of specimens A] obtained in S801 and the [number of specimens C] obtained in S802 satisfy the predetermined relationship (second relationship). In this example, the second relationship is represented by the [number of specimens A]>the [number of specimens C], when this relationship is satisfied (that is, when the [number of specimens A] is larger than the [number of specimens C]), the process proceeds to S804. Otherwise, the process proceeds to S805. When the inspection device 103 is single, since the [number of specimens C] is 0, when the [number of specimens A] is not 0, the process proceeds to S804; otherwise, the process proceeds to S805.

In S804, the control unit 121 prohibits the inspection device 103 from stopping the inspection. That is, after S804, the inspection is continuously performed in the inspection device 103, and the user cannot stop the inspection at any time. When the process of S804 is completed, the series of flows illustrated in FIG. 8 is ended.

In S805, the control unit 121 controls the inspection device to permit the inspection stop. Although it is not necessary to stop the inspection immediately at this point (usually it is not stopped), after S805, the user can stop the inspection at any time. When the process of S805 is completed, the series of flows illustrated in FIG. 8 is ended.

In the process described as being performed by the data processing unit 125 in the description of FIG. 8, a portion or all of the processes may be performed by the data processing unit 114, the processing result may be transferred from data processing unit 114 to the data processing unit 125 via the communication unit 126.

FIG. 9 illustrates an inspection stop screen in the inspection device. The inspection device 103 may include the display device not illustrated in FIG. 1, and the screen of FIG. 9 may be output on the display device.

In the inspection screen of FIG. 9 (*a*), when the user operates an "inspection stop" button in a case of permitting the inspection stop, the inspection of the inspection device 103 is stopped. On the other hand, when the user operates the "inspection stop" button in a case of prohibiting the inspection stop, the screen transitions to the dialog screen representing that the inspection stop is not permitted as illustrated in FIG. 9 (*b*).

As a modification, when the inspection stop is prohibited, as illustrated in FIG. 9 (*c*), the "inspection stop" button may be displayed in an inactive state so that the button cannot be operated.

By displaying such a screen, when the inspection stop is prohibited, the user cannot stop the inspection and can know that the inspection stop is prohibited.

As described above, in the present embodiment, when there is no production-completed specimen of which the inspection of the inspection device is not started, or only when the inspection of the production-completed specimen can be started by another inspection device not in a prescribed time, the inspection stop of the inspection device is permitted. Accordingly, it is possible to manage the specimen so that the specimen is inspected within an appropriate time after the production of the specimen is completed, and it is possible to obtain the effect of preventing inability to start the inspection with the inspection device after the production of the specimen is completed.

In the second embodiment, in S802, the [number of specimens C] is calculated assuming that the inspection of the inspection device 103 is stopped, as a modification, the inspection of the inspection device 103 may be assumed not to be stopped. For example, when the inspection stop in one inspection device 103 (first inspection device) does not affect the inspection in another inspection device 103, it is not necessary to assume that the inspection of the first inspection device is stopped.

It is noted that the above-described embodiments and modifications thereof are examples illustrating the invention, and the scope of the invention is not limited to these.

REFERENCE SIGNS LIST

101: analysis device
102: specimen production device
103: inspection device
111: control unit
112: production unit
113: production history management unit
114: data processing unit
115: communication unit
121: control unit
122: inspection unit
123: carry-in history management unit
124: inspection history management unit
125: data processing unit
126: communication unit
131: network
201: biological sample
202: specimen

The invention claimed is:

1. An analysis device comprising:
   at least one inspection device performing inspection of a specimen; and at least one specimen production device producing the specimen, wherein
   the analysis device includes a data processing unit processing data,
   each of the inspection device and the specimen production device includes a communication unit communicating with each other,
   the specimen production device includes a control unit controlling the specimen production device, and a production unit producing the specimen, and
   the inspection device includes a control unit controlling the inspection device, and an inspection unit performing inspection of the specimen, wherein
   in the analysis device, the data processing unit calculates a value [number of specimens A] representing the number of specimens of no carry-in to the inspection device, and a value [number of specimens B] representing a sum of the number of specimens of which the inspection can be additionally started in the inspection device and the number of specimens of on-inspection of which the inspection is completed in a prescribed time, and
   the control unit of the specimen production device prohibits production of a new specimen in the specimen production device when the [number of specimens A] and the [number of specimens B] satisfy a first relationship.

2. The analysis device according to claim 1, wherein, after the control unit of the specimen production device prohibits the production of the new specimen, when the [number of specimens A] and the [number of specimens B] do not satisfy the first relationship, the prohibition on the production of the new specimen is released in the specimen production device.

3. The analysis device according to claim 2, wherein the specimen production device can select one of an automatic production mode and a manual production mode for the production of the specimen, wherein
   in a case where the control unit of the specimen production device releases the prohibition of producing the new specimen,
   the control unit of the specimen production device starts the production of the new specimen when the automatic production mode is selected, and
   the control unit of the specimen production device notifies that the production of the new specimen is possible when the manual production mode is selected.

4. The analysis device according to claim 1, wherein the analysis device includes a plurality of the inspection devices, wherein
   the control unit of a first inspection device calculates a value [number of specimens C] representing a sum of the number of specimens of which the inspection can be additionally started in another inspection device and the number of specimens of on-inspection of which the inspection is completed in another inspection device in a prescribed time, and
   the control unit of the first inspection device prohibits inspection stop in the first inspection device when the [number of specimens A] and the [number of specimens C] satisfy a second relationship.

5. The analysis device according to claim 1, wherein the inspection device is single, wherein
   the control unit of the inspection device prohibits inspection stop when the [number of specimens A] is not 0.

6. The analysis device of claim 1, wherein the first relationship is represented by the [number of specimens A]≥the [number of specimens B].

7. A specimen production device producing a specimen, the device comprising:

a control unit controlling the specimen production device;

a production unit producing the specimen;

a data processing unit processing data; and a communication unit communicating with an inspection device performing inspection of the specimen, wherein in the specimen production device, the data processing unit calculates a value [number of specimens A] representing the number of specimens of no carry-in to the inspection device, and a value [number of specimens B] representing a sum of the number of specimens of which the inspection can be additionally started in the inspection device and the number of specimens of on-inspection of which the inspection is completed in a prescribed time, and the control unit prohibits production of a new specimen when the [number of specimens A] and the [number of specimens B] satisfy a first relationship.

8. The specimen production device according to claim 7, wherein, after the control unit prohibits the production of the new specimen, when the [number of specimens A] and the [number of specimens B] do not satisfy the first relationship, the prohibition on the production of the new specimen is released in the specimen production device.

9. The specimen production device according to claim 7, wherein the specimen production device can select one of an automatic production mode and a manual production mode for the production of the specimen, wherein in a case where the control unit releases the prohibition of producing the new specimen, the control unit starts the production of the new specimen when the automatic production mode is selected, and the control unit notifies that the production of the new specimen is possible when the manual production mode is selected.

10. An inspection device performing inspection of a specimen, the device comprising:

a control unit controlling the inspection device;

an inspection unit inspecting the specimen; and a data processing unit processing data, wherein in the inspection device, the data processing unit calculates a value [number of specimens A] representing the number of specimens of no carry-in to the inspection device, and a value [number of specimens C] representing a sum of the number of specimens of which the inspection can be additionally started in another inspection device and the number of specimens of on-inspection of which the inspection is completed in another inspection device in a prescribed time, and the control unit prohibits inspection stop when the [number of specimens A] and the [number of specimens C] satisfy a second relationship.

11. An operation method for a specimen production device producing a specimen, the method comprising:

a step of allowing a data processing unit of the specimen production device to calculate a value [number of specimens A] representing the number of specimens of no carry-in to an inspection device, and a value [number of specimens B] representing a sum of the number of specimens of which the inspection can be additionally started in the inspection device and the number of specimens of on-inspection of which the inspection is completed in a prescribed time; and a step of allowing a control unit of the specimen production device to prohibit production of a new specimen in the specimen production device when the [number of specimens A] and the [number of specimens B] satisfy a first relationship.

12. An operation method for an inspection device performing inspection of a specimen, the method comprising:

a step of allowing a data processing unit of the inspection device to calculate a value [number of specimens A] representing the number of specimens of no carry-in to the inspection device, and a value [number of specimens C] representing a sum of the number of specimens of which the inspection can be additionally started in another inspection device and the number of specimens of on-inspection of which the inspection is completed in another inspection device in a prescribed time; and a step of allowing a control unit of the inspection device to prohibit inspection stop when the [number of specimens A] and the [number of specimens C] satisfy a second relationship.

* * * * *